United States Patent
Lin

(10) Patent No.: US 9,846,824 B2
(45) Date of Patent: Dec. 19, 2017

(54) IMAGE FORMING APPARATUS, METHOD FOR CONTROLLING IMAGE FORMING APPARATUS, AND STORAGE MEDIUM FOR PROVIDING PRINT-COST-REDUCING SETTINGS

(71) Applicant: CANON KABUSHIKI KAISHA, Tokyo (JP)

(72) Inventor: Zhi Lin, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/745,153

(22) Filed: Jun. 19, 2015

(65) Prior Publication Data
US 2015/0371118 A1    Dec. 24, 2015

(30) Foreign Application Priority Data

Jun. 23, 2014  (JP) .................. 2014-127852

(51) Int. Cl.
*G06F 3/12* (2006.01)
*G06K 15/02* (2006.01)

(52) U.S. Cl.
CPC ....... *G06K 15/1806* (2013.01); *G06F 3/1231* (2013.01); *G06F 3/1285* (2013.01); *G06K 15/1817* (2013.01)

(58) Field of Classification Search
CPC combination set(s) only.
See application file for complete search history.

(56) References Cited

U.S. PATENT DOCUMENTS

| | | | |
|---|---|---|---|
| 2008/0193183 A1* | 8/2008 | Hiraike | G06K 15/005 400/70 |
| 2009/0225334 A1* | 9/2009 | Takamiya | H04N 1/46 358/1.9 |
| 2012/0212758 A1* | 8/2012 | Eom | G06F 3/1204 358/1.13 |
| 2012/0262742 A1* | 10/2012 | Yano | H04N 1/46 358/1.9 |
| 2014/0002861 A1* | 1/2014 | Kuwahara | H04N 1/00233 358/1.15 |

FOREIGN PATENT DOCUMENTS

JP    2012-218282 A    11/2012

* cited by examiner

*Primary Examiner* — Henok A Shiferaw
(74) *Attorney, Agent, or Firm* — Canon U.S.A. Inc. IP Division

(57) ABSTRACT

An image forming apparatus includes a storage unit that stores a plurality of print jobs, an acquisition unit that acquires, when a desired print job is selected from the plurality of print jobs stored in the storage unit, a print setting of the selected print job, a determination unit that determines whether a print-cost-reducing print setting exists that reduces a print cost more than a print cost of the print setting acquired by the acquisition unit, and a changing unit that, if it is determined that the print-cost-reducing setting exists, enables changing the print setting of the selected print job to the print-cost-reducing print setting.

21 Claims, 19 Drawing Sheets

FIG. 8

- DOCUMENT NAME ~1101
- DATE ~1102
    - PRINT SETTINGS ~1103
        - ONE-SIDED/TWO-SIDED ~1104
        - COLOR MODE ~1105
        - PAGE LAYOUT ~1106
    - · · · · ·

FIG. 9

| COLOR MODE SETTING | COLOR | | | | MONOCHROME | | |
|---|---|---|---|---|---|---|---|
| ONE-SIDED/TWO-SIDED SETTING | ONE-SIDED | | | | TWO-SIDED | | |
| PAGE LAYOUT SETTING | 1in1 | 2in1 | 4in1 | 6in1 | 8in1 | 9in1 | 16in1 |

1900

IMAGE FORMING APPARATUS, METHOD FOR CONTROLLING IMAGE FORMING APPARATUS, AND STORAGE MEDIUM FOR PROVIDING PRINT-COST-REDUCING SETTINGS

BACKGROUND

Field

Aspects of the present invention generally relate to an image forming apparatus, a method for controlling an image forming apparatus, and a storage medium.

Description of the Related Art

In recent years, there has been a type of image forming apparatuses that can change at arbitrary timing a print setting of a print job input from a personal computer, a scanner, etc. Further, according to the worldwide ecology concerns, there is an image forming apparatus in which when a print job reserved in the image forming apparatus is to be output, a system determines settings of the print job and displays as a warning a setting of the print job that there is room for print cost reduction.

Meanwhile, Japanese Patent Application Laid-Open No. 2012-218282 discusses a technique with which input, edit, and output settings of an image forming apparatus are automatically or manually changed to settings that lead to print cost reduction (e.g., N in 1, two-sided, monochrome). To change a parameter, a preregistered setting value that leads to print cost reduction is applied.

The print settings employed in Japanese Patent Application Laid-Open No. 2012-218282 are fixed settings that are registered in advance. Thus, it is not possible to change the print settings according to a job, and in some cases, the print settings may be changed to print settings that may lead to higher cost. For example, a job that is already set to cost-reducing print settings (e.g., 4 in 1, monochrome) may be changed to preregistered print settings such as 2 in 1 or color that do not lead to cost reduction.

Furthermore, according to Japanese Patent Application Laid-Open No. 2012-218282, a system forcibly changes settings of a job to predetermined settings. Thus, it is not possible to print using settings that do not lead to cost reduction. For example, in a case of printing a contract document or the like, although a template output such as 1 in 1 and one-sided is necessary, since the print settings are automatically changed to print settings such as 2 in 1 or two-sided, it is not possible to print using settings desired by the user.

SUMMARY

Aspects of the present invention are generally directed to a mechanism capable of dynamically providing only print-cost-reducing print settings with respect to print settings of a print job, thereby enabling easy application of the print-cost-reducing print settings.

According to an aspect of the present invention, an image forming apparatus includes a storage unit configured to store a plurality of print jobs, an acquisition unit configured to acquire, when a desired print job is selected from the plurality of print jobs stored in the storage unit, a print setting of the selected print job, a determination unit configured to determine whether a print-cost-reducing print setting exists that reduces a print cost more than a print cost of the print setting acquired by the acquisition unit, and a changing unit configured to, if it is determined that the print-cost-reducing setting exists, enable changing the print setting of the selected print job to the print-cost-reducing print setting.

Further features of the present disclosure will become apparent from the following description of exemplary embodiments with reference to the attached drawings.

BRIEF DESCRIPTION OF THE DRAWINGS

FIG. 8 illustrates an example of an attribute of a print job.

FIG. 9 illustrates an example of a list of setting values that can be set as print settings.

DESCRIPTION OF THE EMBODIMENTS

Various exemplary embodiments will be described below with reference to the drawings.

Figure 1:
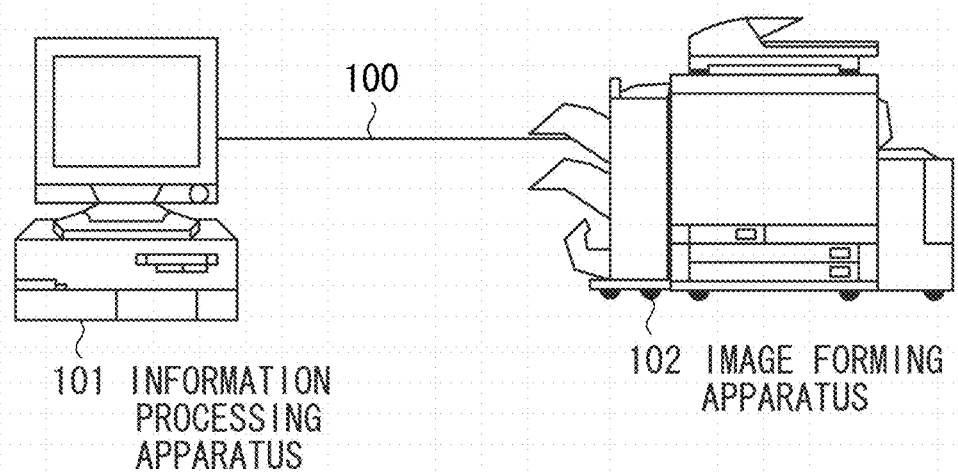
FIG. 1 illustrates an example of a print system to which an image forming apparatus according to an exemplary embodiment is applicable.

FIG. 1 illustrates an example of a configuration of a reservation print system to which an image forming apparatus according to a first exemplary embodiment is applicable.

In FIG. 1, an information processing apparatus 101 (e.g., personal computer (PC)) is an information processing apparatus that can be connected to a network, and an image forming apparatus 102 is an image forming apparatus that can print a print job received from the information processing apparatus 101.

In the present exemplary embodiment, the information processing apparatus 101 and the image forming apparatus 102 are connected via a network 100 such as a local area network (LAN). However, the connection method is not limited to a network, and any connection method, such as a parallel cable, a serial cable, a universal serial bus (USB) cable, etc., are applicable.

Figure 2:
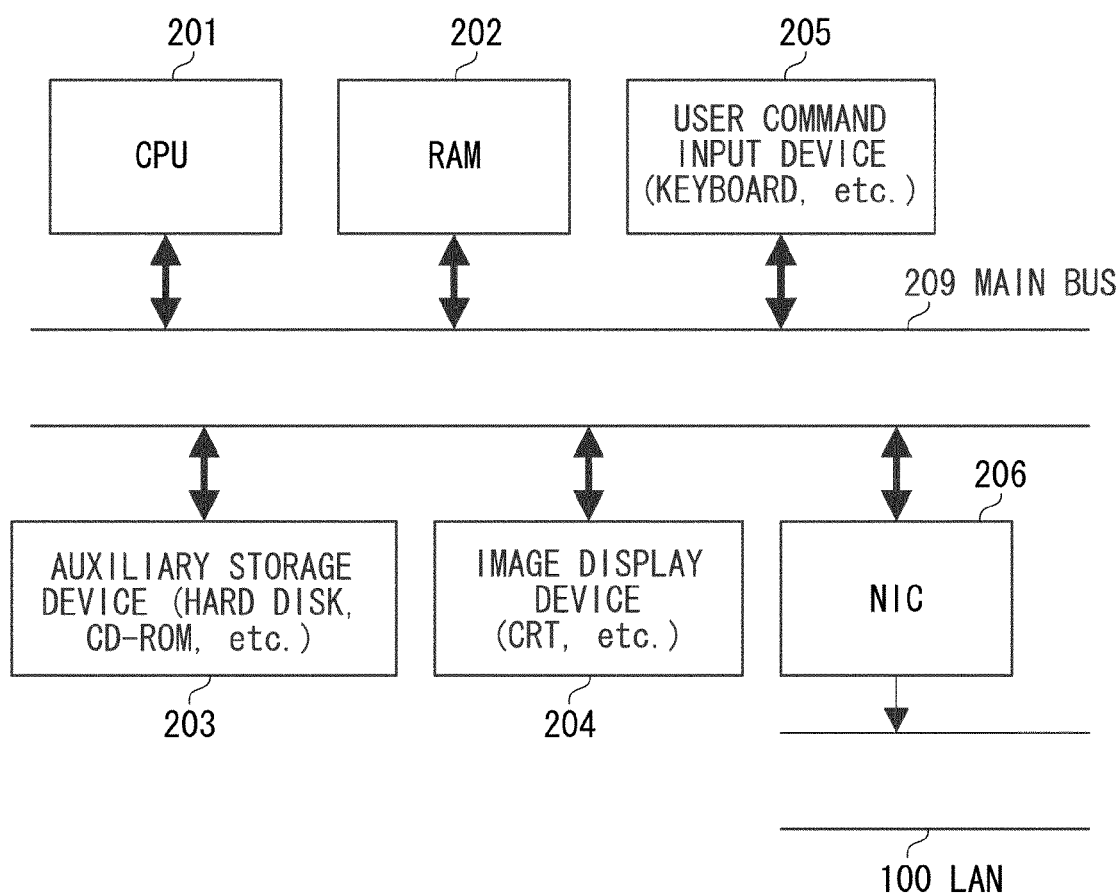
FIG. 2 is a block diagram illustrating an example of an internal configuration of an information processing apparatus.

FIG. 2 illustrates an example of an internal configuration of a commonly-used information processing apparatus. The information processing apparatus 101 illustrated in FIG. 1 also has a similar internal configuration.

A central processing unit (CPU) 201 performs information processing of the present exemplary embodiment. A random-access memory (RAM) 202 provides a work area of the CPU 201. An auxiliary storage device 203 provides a control program of the present exemplary embodiment. The auxiliary storage device 203 is, for example, a hard disk, a floppy (registered trademark) disk, a compact disk read only memory (CD-ROM), etc.

An image display device 204 notifies a user of messages and the like and displays a user interface (UI) screen. The image display device 204 is specifically a cathode ray tube (CRT) display, a liquid crystal display (LCD), etc. A user command input device 205 is used to input user commands. The user command input device 205 is specifically a mouse, a keyboard, etc.

A network interface card (NIC) 206 is for sending and receiving data to and from other network devices via the LAN 100. The internal configuration also includes a main bus 209.

Figure 3:
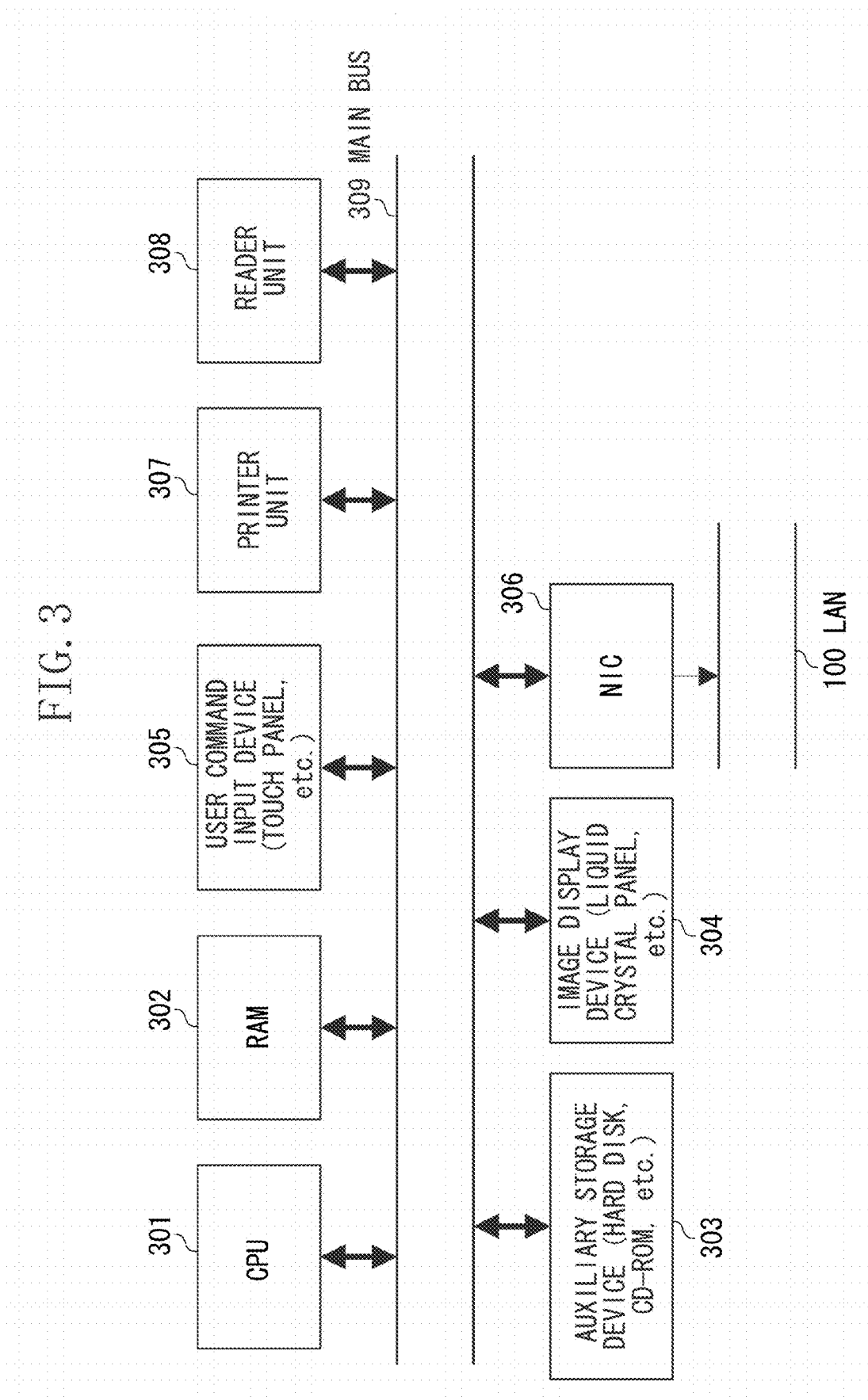
FIG. 3 is a block diagram illustrating an example of an internal configuration of an image forming apparatus.

FIG. 3 illustrates an example of an internal configuration of the image forming apparatus 102.

In FIG. 3, a CPU 301 performs information processing at the time of the control of the image forming apparatus 102. A RAM 302 provides a work area of the CPU 301, and temporarily stores data. An auxiliary storage device 303 temporarily stores data and is used in place of the RAM 302. The auxiliary storage device 303 is, for example, a hard disk, a solid state drive, and a CD-ROM.

An image display device 304 is a liquid crystal panel or the like and used to display the state of the image forming apparatus 102, an error message, an operation screen, etc. A user command input device (e.g., touch panel) 305 is operated by a user to select a desired print job, etc. The image display device 304 and the user command input device 305 constitute an operation unit of the image forming apparatus 102.

A NIC 306 is for bidirectionally sending and receiving data to and from other network devices via the LAN 100.

A printer unit (print engine) 307 is configured to print scanned image data or the like on a sheet. The printer unit 307 can identify states of sheet feeding options (e.g., sheet feeding cassette) and sheet discharging options (e.g., finisher apparatus) that relate to a print process.

A reader unit (scanner) 308 reads a sheet document placed on a platen glass and creates binary monochrome image data, multi-value color image data, etc. Image data read by the reader unit 308 can be printed by the printer unit 307 or can be reserved in the auxiliary storage device 303 and then printed at an arbitrary timing.

The internal configuration also includes a main bus 309.

Figure 4:
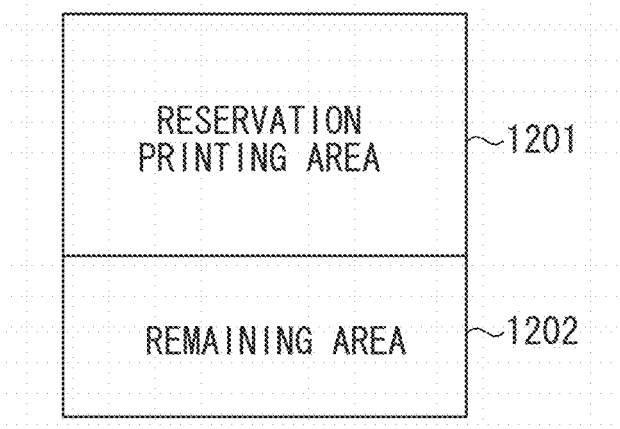
FIG. 4 is a conceptual diagram illustrating an example of areas in an auxiliary storage device.

FIG. 4 is a conceptual diagram illustrating an example of areas in the auxiliary storage device 303.

In the present exemplary embodiment, the areas in the auxiliary storage device 303 include a reservation printing area 1201 and a remaining area 1202. The reservation printing area 1201 is an area for storing a print job. The remaining area 1202 is an area other than the reservation printing area 1201 and is for temporarily storing a copy job and a scanner job from the reader unit 308.

Figure 5:
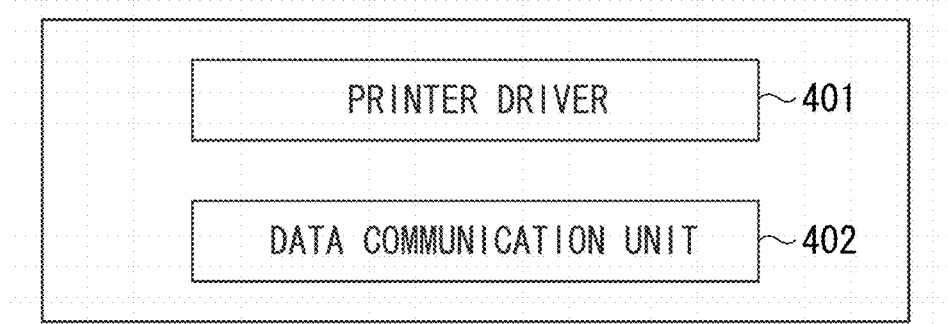
FIG. 5 illustrates an example of modules of a control program of an information processing apparatus.

FIG. 5 illustrates an example of modules of a control program relating to the printing control of the information processing apparatus 101, stored in the auxiliary storage device 203 of the information processing apparatus 101.

Control modules 401 and 402 are read to the RAM 202 and executed by the CPU 201 to provide a function to the information processing apparatus 101.

The printer driver 401 is for generating a print job in response to an instruction from an arbitrary application such as text editor and inputting the generated print job to the image forming apparatus 102.

A data communication unit 402 is used to input a print job generated by the printer driver 401 to the image forming apparatus 102, and also used to receive a processing result of an input print job from the image forming apparatus 102. While the NIC 206 is used as hardware of the data communication unit 402, the data communication unit 402 may be an interface such as a USB.

Figure 6:
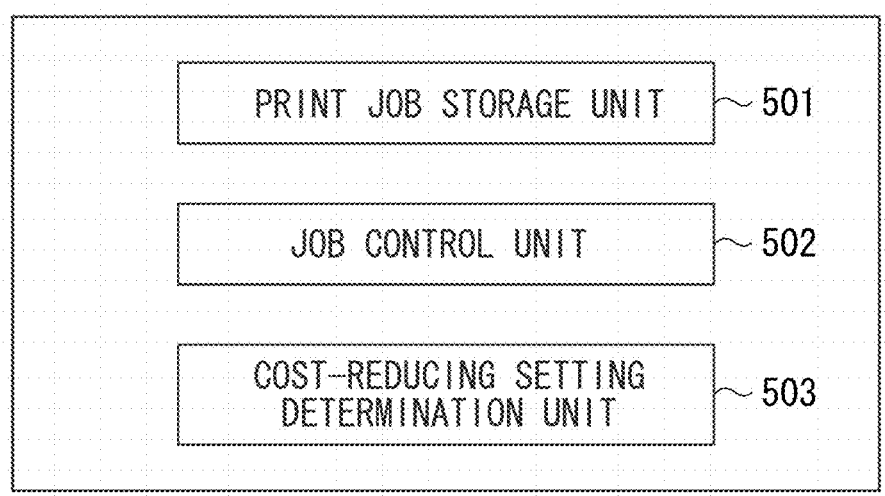
FIG. 6 illustrates an example of modules of a control program of an image forming apparatus.

FIG. 6 illustrates an example of modules of a program relating to the control of the reservation print system, stored in the auxiliary storage device 303 of the image forming apparatus 102.

Control modules 501 to 503 are read to the RAM 302 and executed by the CPU 301 to provide a function to the image forming apparatus 102.

The print job storage unit 501 is for storing a print job input from the information processing apparatus 101 in the reservation printing area 1201, and for storing a copy job and a scan job input from the reader unit 308 of the image forming apparatus 102 in the remaining area 1202.

The job control unit 502 is a control unit configured to read a document name 1101, date 1102, and print settings 1103 (FIG. 8) of a job reserved in the auxiliary storage device 303, display the document name 1101, the date 1102, and the print settings 1103 on the image display device 304, and perform print processing of a print job.

The cost-reducing setting determination unit 503 determines whether the print settings 1103 read by the job control unit 502 are print settings that lead to cost reduction.

The image forming apparatus 102 according to the present exemplary embodiment is configured to store an input print job in the reservation printing area 1201 and then select and print a print job stored in the reservation printing area 1201. The cost-reducing setting determination unit 503 checks the print settings 1103 of a selected print job and determines whether there is a print-cost-reducing setting. Then, an ecological setting button for applying the cost-reducing setting is displayed on the image display device 304 of the image forming apparatus 102. The setting corresponding to the ecological setting button is applied to the print job when the ecological setting button is pressed.

Figure 7:
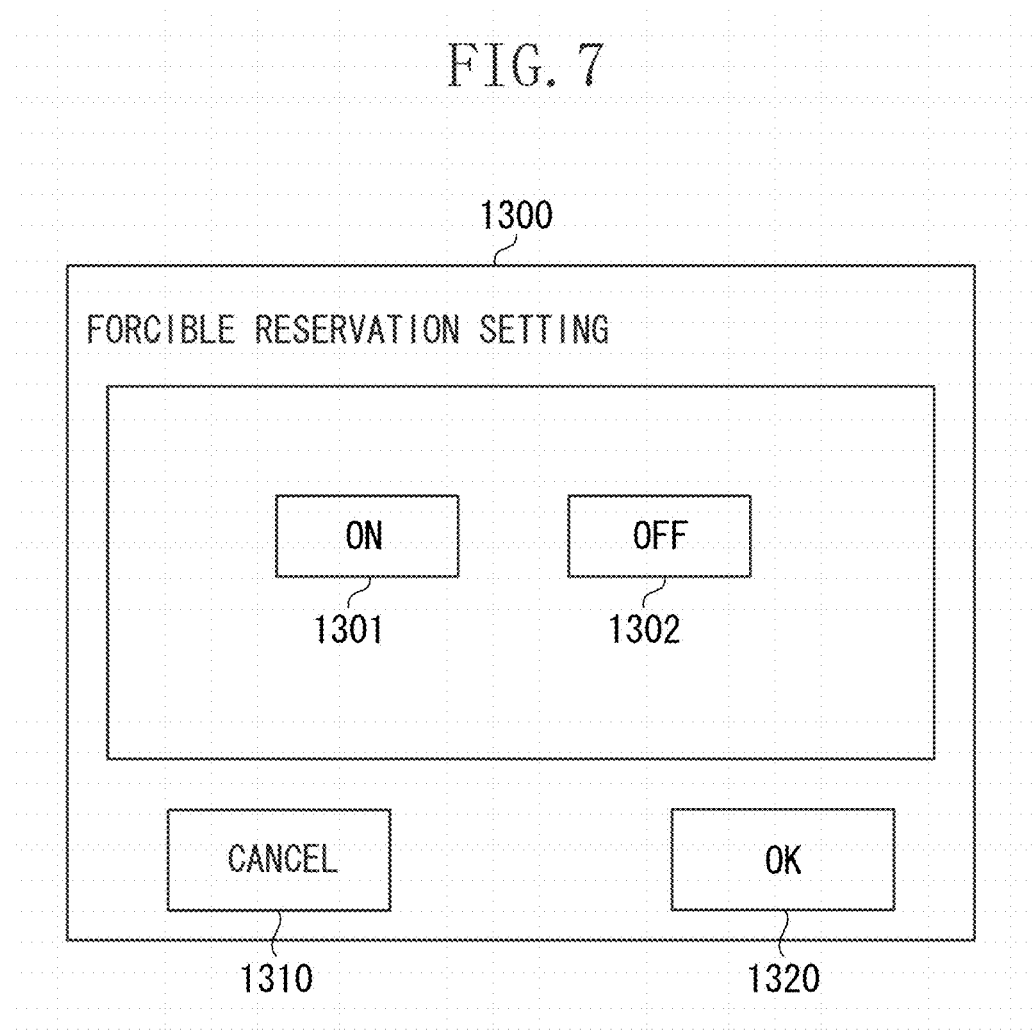
FIG. 7 illustrates an example of a forcible reservation mode switching screen.

FIG. 7 illustrates an example of a setting screen for selecting an operation mode to determine whether to apply a forcible reservation mode to the image forming apparatus 102.

When a user selects an "ON" button 1301 and presses an "OK" button 1320 on a setting screen 1300, the forcible reservation mode is turned on. Further, when a user selects an "OFF" button 1302 and presses the "OK" button 1320, the forcible reservation mode is turned off.

As used herein, the phrase "the forcible reservation mode is on" refers to a mode in which an input print job is forcibly stored in the reservation printing area 1201. On the other hand, the phrase "the forcible reservation mode is off" refers to a mode in which an input print job is not temporarily stored in the reservation printing area 1201.

When a cancel button 1310 is pressed, the setting screen 1300 is closed without reflecting the forcible reservation mode ON/OFF setting selected on the setting screen 1300.

In the forcible reservation mode set on the setting screen 1300, the job control unit 502 can refer to the printing settings 1103 at an arbitrary timing. Further, in the present exemplary embodiment, the forcible reservation mode is on. The setting of the forcible reservation mode is stored in the auxiliary storage device 303 of the image forming apparatus 102, etc.

FIG. 8 illustrates an example of an attribute of a print job input from the information processing apparatus 101 or the reader unit 308 of the image forming apparatus 102.

An attribute of a print job is generated based on the settings from the printer driver 401 of the information processing apparatus 101 or the user command input device 305 of the image forming apparatus 102. Further, the generated attribute of a print job is associated with the corresponding print job and stored in the reservation printing area 1201 and the remaining area 1202 of the auxiliary storage device 303 of the image forming apparatus 102.

The attribute of the print job includes a job name 1101 and print settings 1103 such as a one-sided/two-sided setting 1104, a color mode setting 1105, a page layout setting 1106, etc.

The one-sided/two-sided setting 1104 indicates a setting about whether to conduct one-sided printing or two-sided printing. The color mode setting 1105 indicates a setting about whether to conduct monochrome printing or color printing. The term "page layout" indicates that images of a plurality of pages are to be laid out on a print surface of one sheet, and the page layout setting 1106 indicates a setting about the number of pages to be imposed on a print surface of a sheet.

The types of the print settings included in the attribute of a print job according to the present exemplary embodiment are not limited to the print settings 1103 such as the one-sided/two-sided setting 1104, the color mode setting 1105, and the page layout setting 1106, and any other settings may also be included.

FIG. 9 illustrates an example of a list of setting values that can be set as print settings, and information corresponding to the list is stored in the auxiliary storage device 303.

As illustrated in FIG. 9, "one-sided" or "two-sided" can be set with respect to the one-sided/two-sided setting 1104 in FIG. 8. Further, "color" or "monochrome" can be set with respect to the color mode setting 1105 in FIG. 8. Further, "1 in 1", "2 in 1", "4 in 1", "6 in 1", "8 in 1", "9 in 1", or "16 in 1" can be set with respect to the page layout setting 1106 in FIG. 8.

In the list, the setting values of the respective types of the print settings are arranged in decreasing order of print cost from the left in FIG. 9. Further, information indicating print cost (e.g., numerical value) may also be stored together with each setting value, and a setting with a lower print cost may be determined based on the information indicating the print cost.

Use of the list of setting values that can be set as illustrated in FIG. 9 enables future addition, edition, and deletion of a setting value that can be set.

Figure 10:
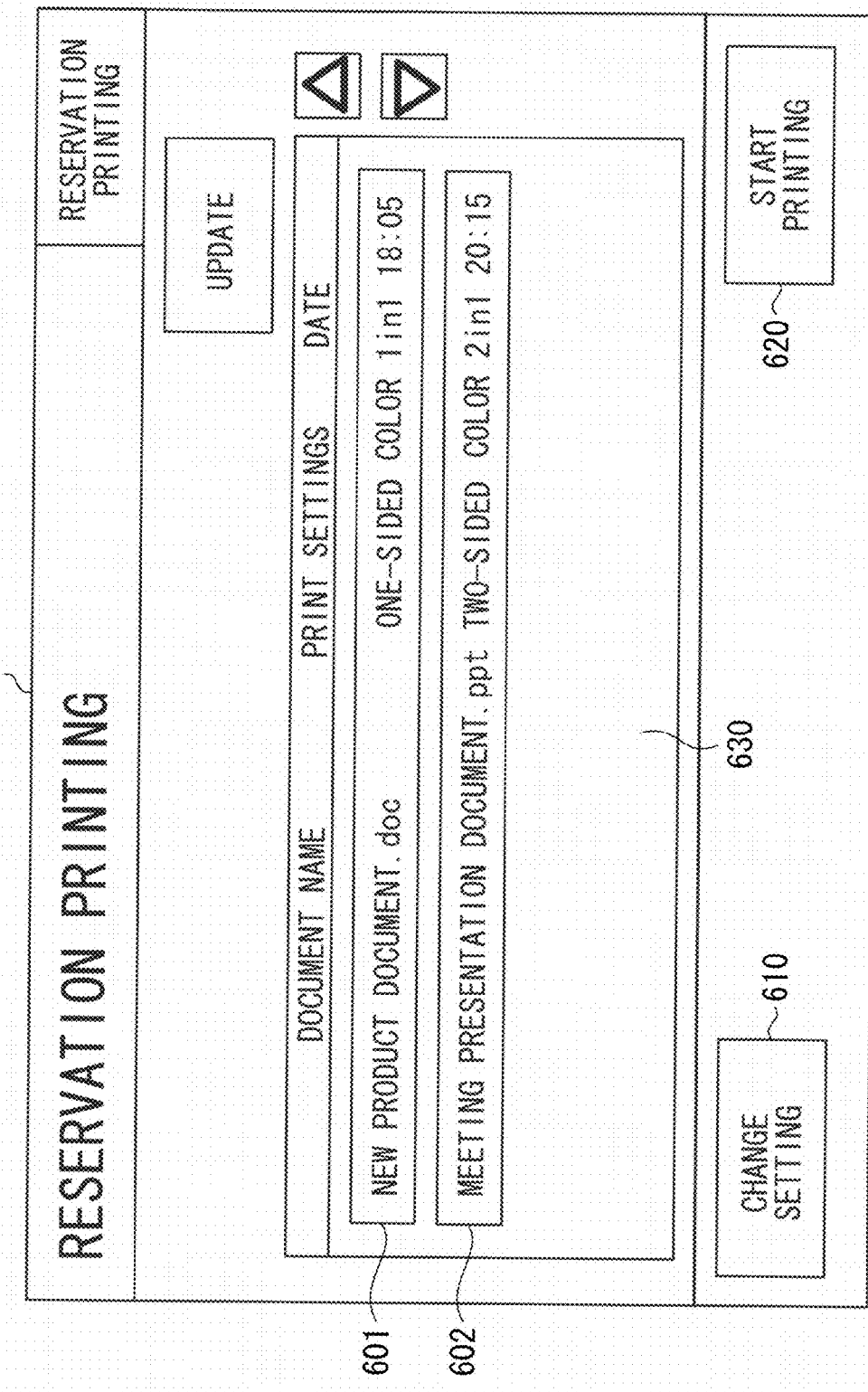
FIG. 10 illustrates an example of a print instruction screen for inputting an instruction to print a print job.

FIG. 10 illustrates an example of a print instruction screen 600 for a print job reserved in the reservation printing area 1201. The print instruction screen 600 is displayed on the image display device 304 of the image forming apparatus 102 by the job control unit 502.

In the case where the forcible reservation mode is on, a print job input from the information processing apparatus 101 is reserved in the auxiliary storage device 303 of the image forming apparatus 102. The job control unit 502 reads the document name 1101, the date 1102, and the print settings 1103 of the job reserved in the auxiliary storage device 303 and displays the document name 1101, the date 1102, and the print settings 1103 on the image display device 304.

A user can select a reserved print job 601 or 602 and check print settings 630 of each print job.

Figure 11:
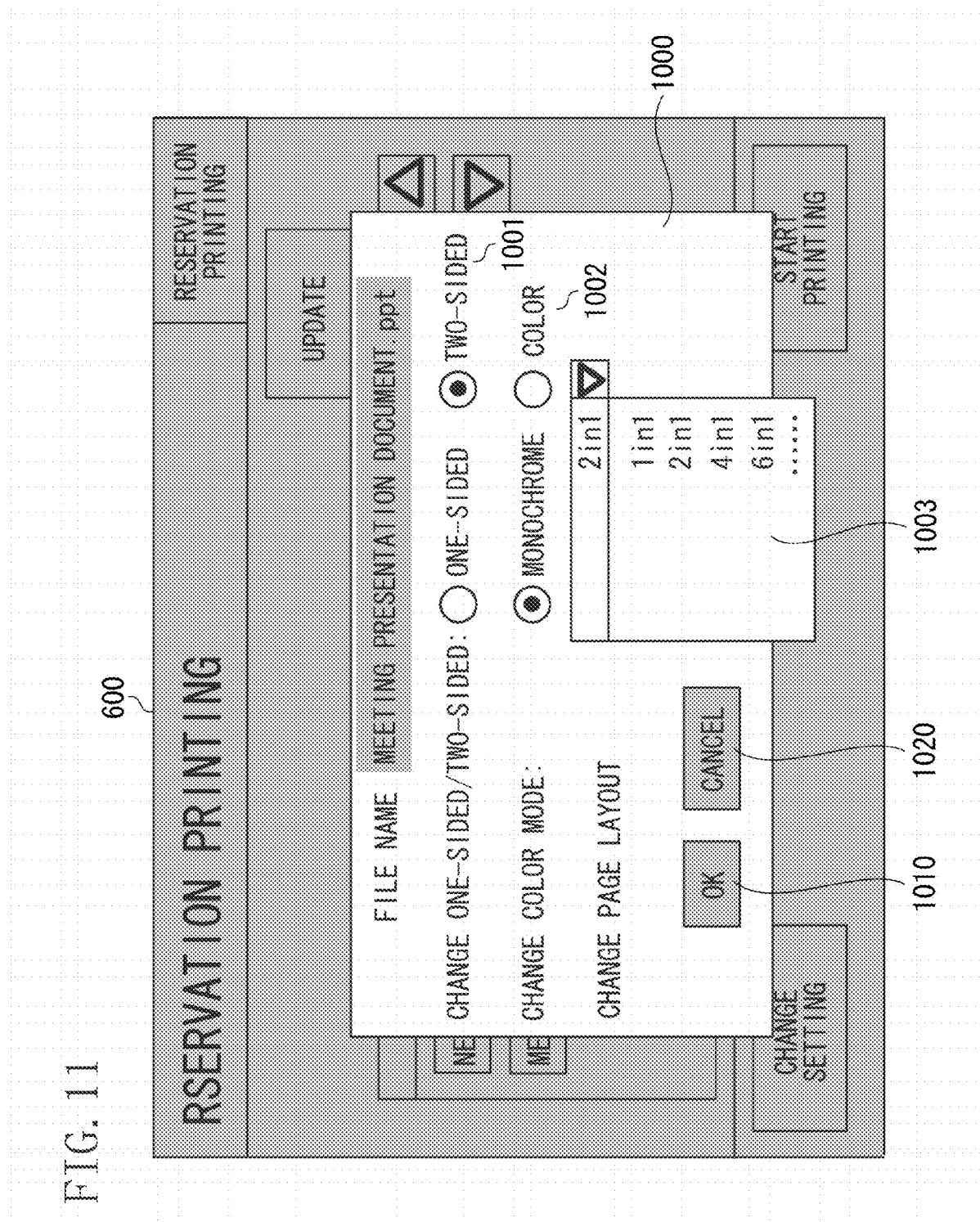
FIG. 11 illustrates an example of a print setting changing screen.

Further, in a case where a user selects the reserved print job 601 or 602 and presses a button 610, a print setting changing screen 1000 as illustrated in FIG. 11 is displayed.

Figure 12:
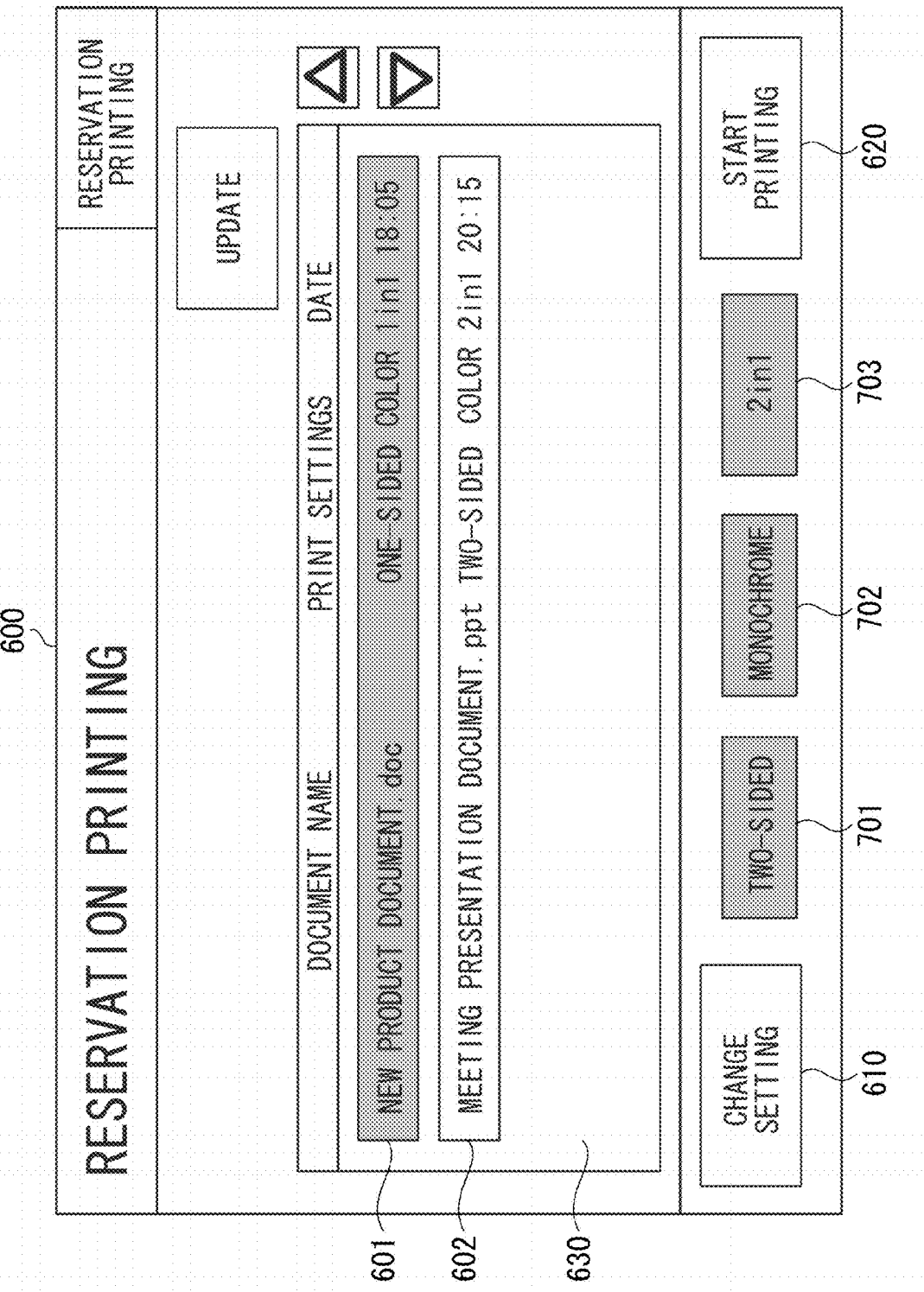
FIG. 12 illustrates an example of a print instruction screen in a case where a print job is selected.
Figure 13:
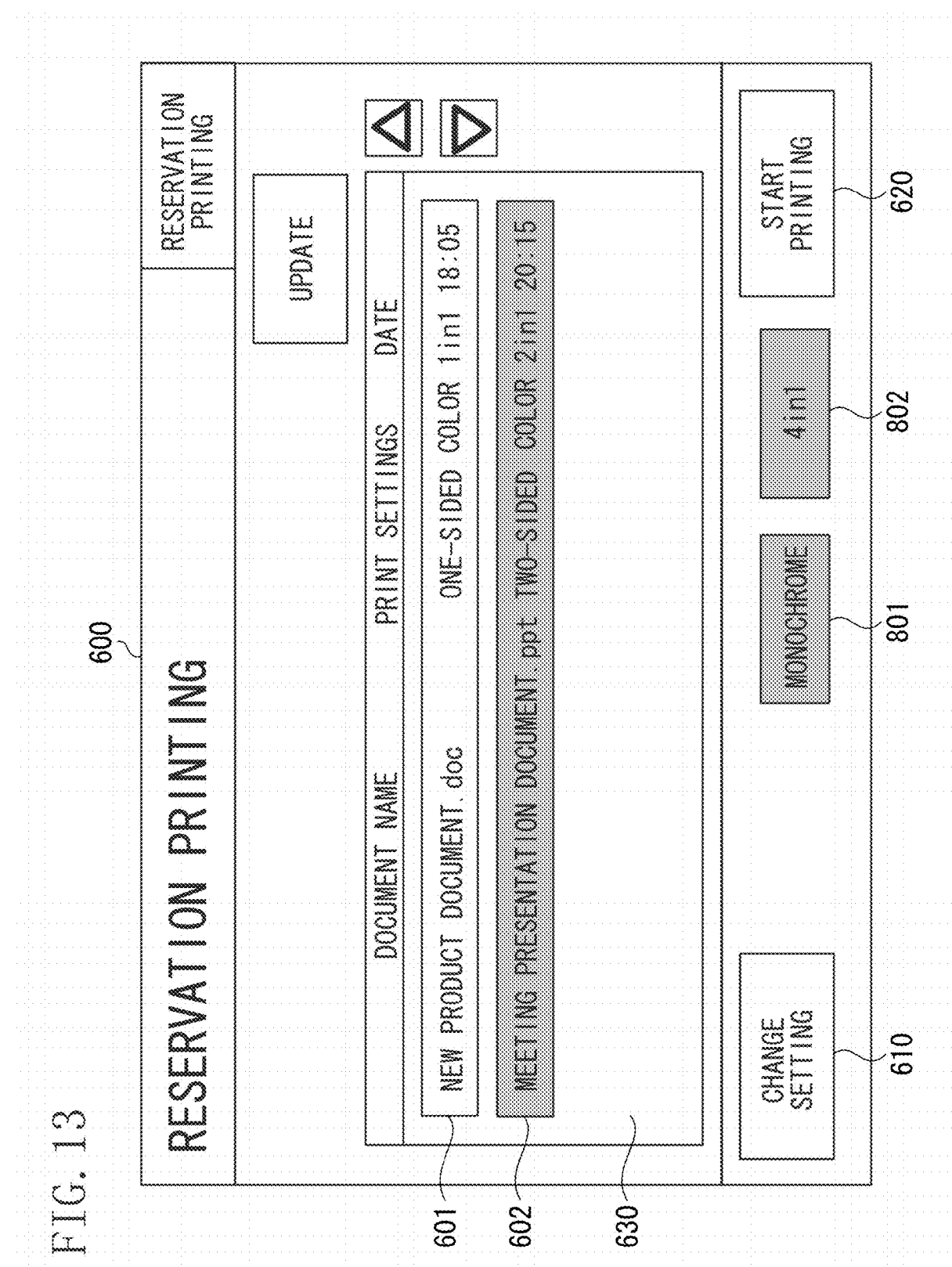
FIG. 13 illustrates an example of a print instruction screen in a case where another print job is selected.

Further, the print instruction screen 600 is changed to a display state illustrated in FIG. 12 in a case where a user selects the reserved print job 601, and the print instruction screen 600 is changed to a display state illustrated in FIG. 13 in a case where a user selects the reserved print job 602.

In a case where a user selects the reserved print job 601 or 602 and presses a print start button 620, the job control unit 502 executes a process of printing the selected print job with the printer unit 307.

FIG. 11 illustrates an example of the print setting changing screen 1000. The print setting changing screen 1000 is displayed on the image display device 304 of the image forming apparatus 102 by the job control unit 502.

A user can change the print settings 630 in FIG. 10 of the selected print job via a radio button 1001 for the one-sided/two-sided setting, radio button 1002 for the color mode setting, or a pull-down menu 1003 for the page layout (N in 1) setting. At the press of an "OK" button 1010, changes in the settings become effective, and the CPU 301 changes corresponding setting values of the print settings 1103 (1104, 1105, 1106, etc.) stored in the RAM 302. Further, at the press of a cancel button 1020, the print setting changing screen 1000 is closed without reflecting the contents of the radio buttons 1001 and 1002, and the pull-down-menu 1003.

FIG. 12 illustrates an example of a print instruction screen in a case where the reserved print job 601 is selected. The print instruction screen is displayed on the image forming apparatus 102 by the job control unit 502.

When the print job 601 is selected, the job control unit 502 refers to the print settings 1103 stored in the reservation printing area 1201 of the auxiliary storage device 303. Then, according to a determination by the cost-reducing setting determination unit 503, the job control unit 502 creates an ecological setting button for reducing the print cost of the print job 601 and displays the created ecological setting button on the image display device 304.

In the example illustrated in FIG. 12, a button 701 for changing the one-sided/two-sided setting 1104 to "two-sided", a button 702 for changing the color mode setting 1105 to "monochrome", and a button 703 for changing the page layout setting 1106 to "2 in 1" are created as ecological setting buttons and displayed on the image display device 304. Each of the ecological setting buttons 701, 702, and 703 is a button indicating details ("two-sided", "monochrome", "2 in 1") of the print setting corresponding to the ecological setting button to enable the user to identify the details of the corresponding print setting with ease.

FIG. 13 illustrates an example of a print instruction screen in the case where the reserved print job 602 is selected. The print instruction screen is displayed on the image forming apparatus 102 by the job control unit 502.

Further, in FIG. 13, when the print job 602 is selected, the job control unit 502 refers to the print settings 1103 stored in the reservation printing area 1201 of the auxiliary storage device 303. Further, according to a determination by the cost-reducing setting determination unit 503, the job control unit 502 creates an ecological setting button for reducing the print cost of the print job 602 and displays the created ecological setting button on the image display device 304.

In the example illustrated in FIG. 13, a button 801 for changing the color mode setting 1105 to "monochrome" and a button 802 for changing the page layout setting 1106 to "4 in 1" are created as ecological setting buttons and displayed on the image display device 304.

In a case where a user presses the ecological setting buttons 801 and 802, the job control unit 502 changes the corresponding setting values 1105 and 1106 of the print settings 1103 stored in the RAM 302. After the change, the job control unit 502, similarly, reads the changed print settings 1103 of the print job. Then, according to a determination by the cost-reducing setting determination unit 503, the job control unit 502 creates an ecological setting button 901 for changing the page layout setting 1106 to "6 in 1" to further reduce the print cost of the print job 602 for which the settings have been changed, and the ecological setting button 901 is displayed on the image display device 304 as illustrated in FIG. 14.

Figure 14:
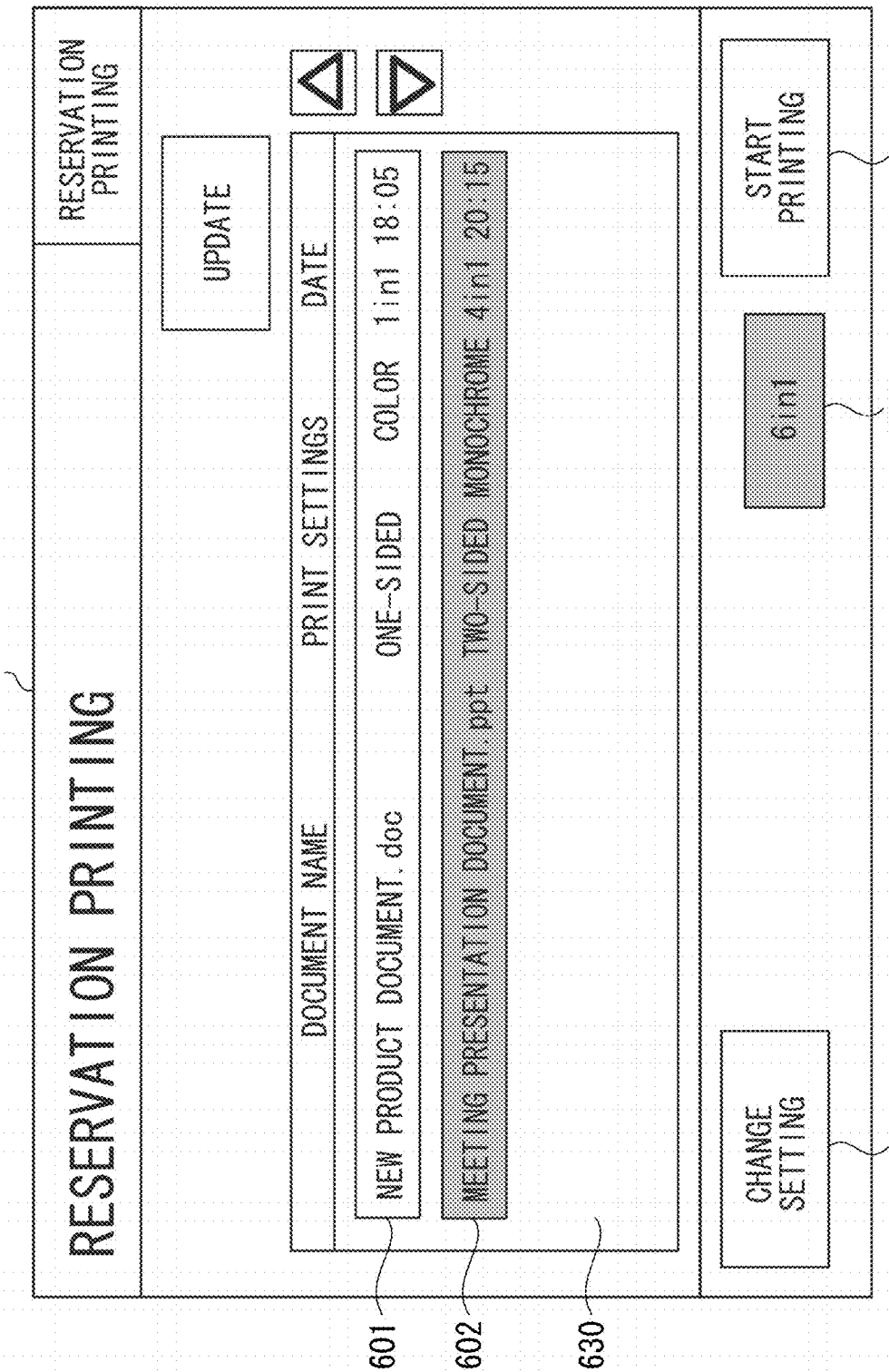
FIG. 14 illustrates an example of a print instruction screen displayed after a print setting is changed.

FIG. 14 illustrates an example of a print instruction screen in a case where the reserved print job 602 is selected and the ecological setting buttons 801 and 802 are pressed to change the print settings. The print instruction screen is displayed on the image forming apparatus 102 by the job control unit 502.

The job control unit 502 further repeats the above-described processes with respect to the print job 602 to create the ecological setting button 901 for changing the page layout setting 1106 to "6 in 1", which leads to further print cost reduction. Details of a determination process performed by the cost-reducing setting determination unit 503 will be described below with reference to FIG. 16.

Another ecological setting button for collectively changing a plurality of types of print settings that can be changed with the buttons 701, 702, and 703 and a plurality of types of print settings that can be changed with the buttons 801 and 802 may be displayed on the image display device 304. The respective types of settings (1104, 1105, 1106) included in the print settings 1103 can be changed collectively at the press of another ecological setting button.

As illustrated in FIGS. 12 to 14, the image forming apparatus 102 dynamically determines print settings that lead to reduction in print costs of a print job in a selected state, and provides to the user the ecological setting buttons for applying the print settings determined as print-cost-reducing settings to the print job in the selected state. Then, when an ecological setting button is selected, a print setting of the print job in the selected state is changed to the print setting corresponding to the selected ecological setting button. Further, when the print setting is changed, a print setting that is more cost reducing than the changed print setting is dynamically determined, and an ecological setting button for applying the print setting determined as a more cost-reducing setting is also provided.

Figure 15:
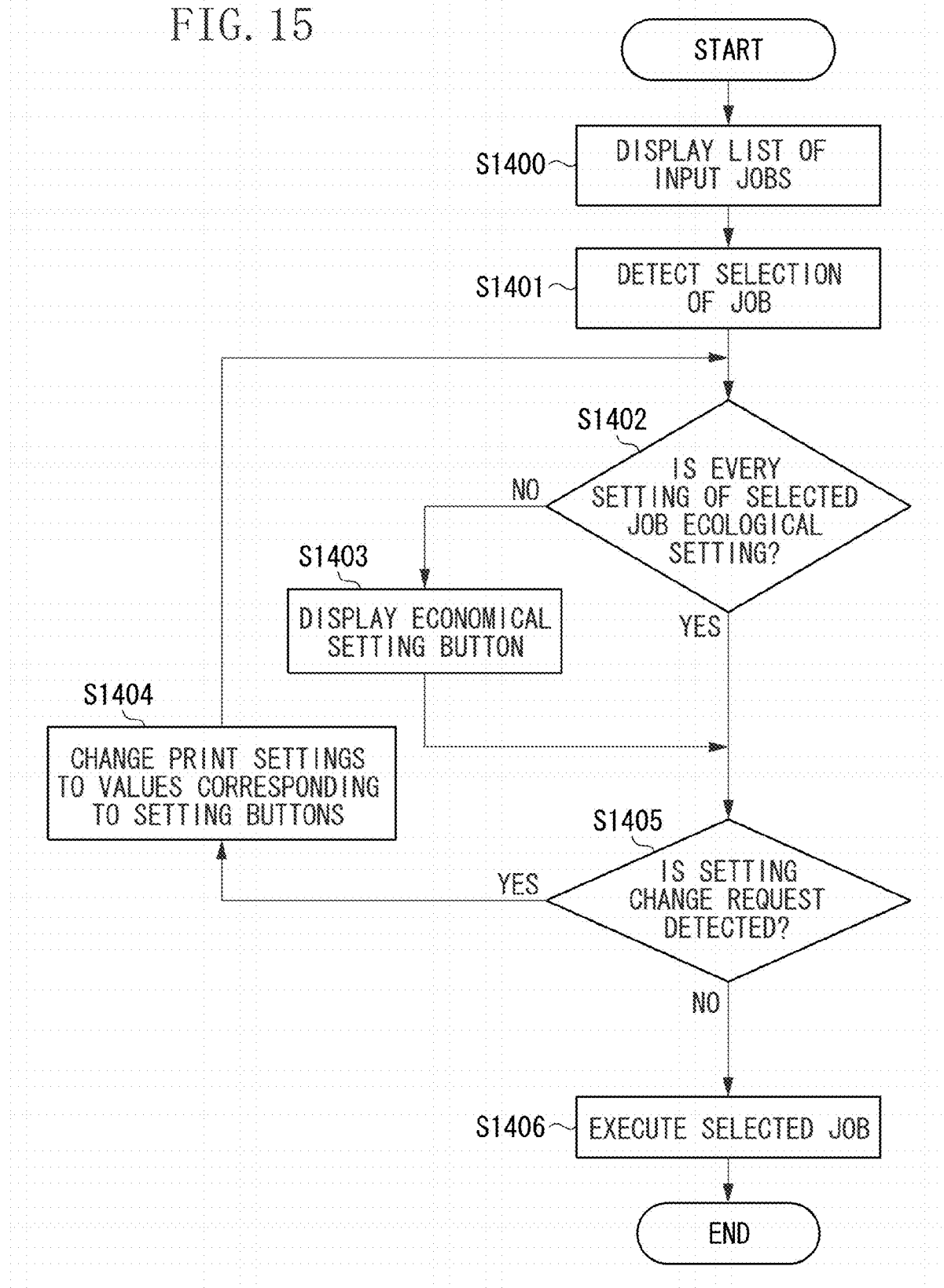
FIG. 15 is a flow chart illustrating a reservation printing process.

FIG. 15 is a flow chart illustrating a reservation print process to be performed by an image processing apparatus according to the present exemplary embodiment. The control modules 502 and 503 are read from the auxiliary storage device 303 to the RAM 302 by the CPU 301 of the image forming apparatus 102 to execute the process illustrated in the flow chart.

For example, when a user logs in via the user command input device 305 of the image forming apparatus 102, the job control unit 502 starts the process illustrated in the flow chart.

First, in step S1400, the job control unit 502 reads a print job of the logged in user that is stored in the reservation printing area 1201 of the auxiliary storage device 303, and the print settings 1103 of the print job, and displays the print job and the print settings 1103 on the image display device 304.

Then, in step S1401, when the user selects a displayed print job, the job control unit 502 detects an operation from the image display device 304, and the processing proceeds to step S1402.

In step S1402, the job control unit 502 executes a cost-reducing setting determination process. First, the job control unit 502 refers to the print settings 1103 of the selected print job that are stored in the reservation printing area 1201 of the auxiliary storage device 303. Further, the cost-reducing setting determination unit 503 determines whether all of the one-sided/two-sided setting 1104, the color mode setting 1105, and the page layout setting 1106 included in the print settings 1103 are print-cost-reducing print settings. Details of the cost-reducing setting determination process to be performed in step S1402 will be described below with reference to FIG. 16.

If the cost-reducing setting determination unit 503 determines that at least one of the one-sided/two-sided setting 1104, the color mode setting 1105, and the page layout setting 1106 is not a cost-reducing print setting (NO in step S1402), the processing proceeds to step S1403.

In step S1403, the job control unit 502 creates an ecological setting button(s) (e.g., the buttons 701 to 703 in FIG. 12, the buttons 801 and 802 in FIG. 13, the button 901 in FIG. 14, etc.) for reducing the print cost of the selected print job, and displays the created ecological setting button(s) on the image display device 304, and the processing proceeds to step S1405.

On the other hand, if the cost-reducing setting determination unit 503 determines that all of the one-sided/two-sided setting 1104, the color mode setting 1105, and the page layout setting 1106 are cost-reducing print settings (YES in step S1402), the processing proceeds to step S1405.

In step S1405, the job control unit 502 determines whether an operation request (processing request) from the user is detected.

Then, a setting change request from the user is detected (YES in step S1405), the processing proceeds to step S1404. The case where a setting change request from the user is detected is a case where the press of an ecological setting button created in step S1403 or the press of the setting change button 610 is detected.

In step S1404, the job control unit 502 changes a corresponding print setting 1103 (1104, 1105, 1106, etc.) of the print job that is stored in the reservation printing area 1201 to a value corresponding to the setting button, and the processing returns to step S1402.

On the other hand, in step S1405, if a print execution request from the user is detected (NO in step S1405), the processing proceeds to step S1406. The case where a print execution request from the user is detected is a case where the press of the print start button 620 is detected.

In step S1406, the job control unit 502 executes the selected print job.

Figure 16:
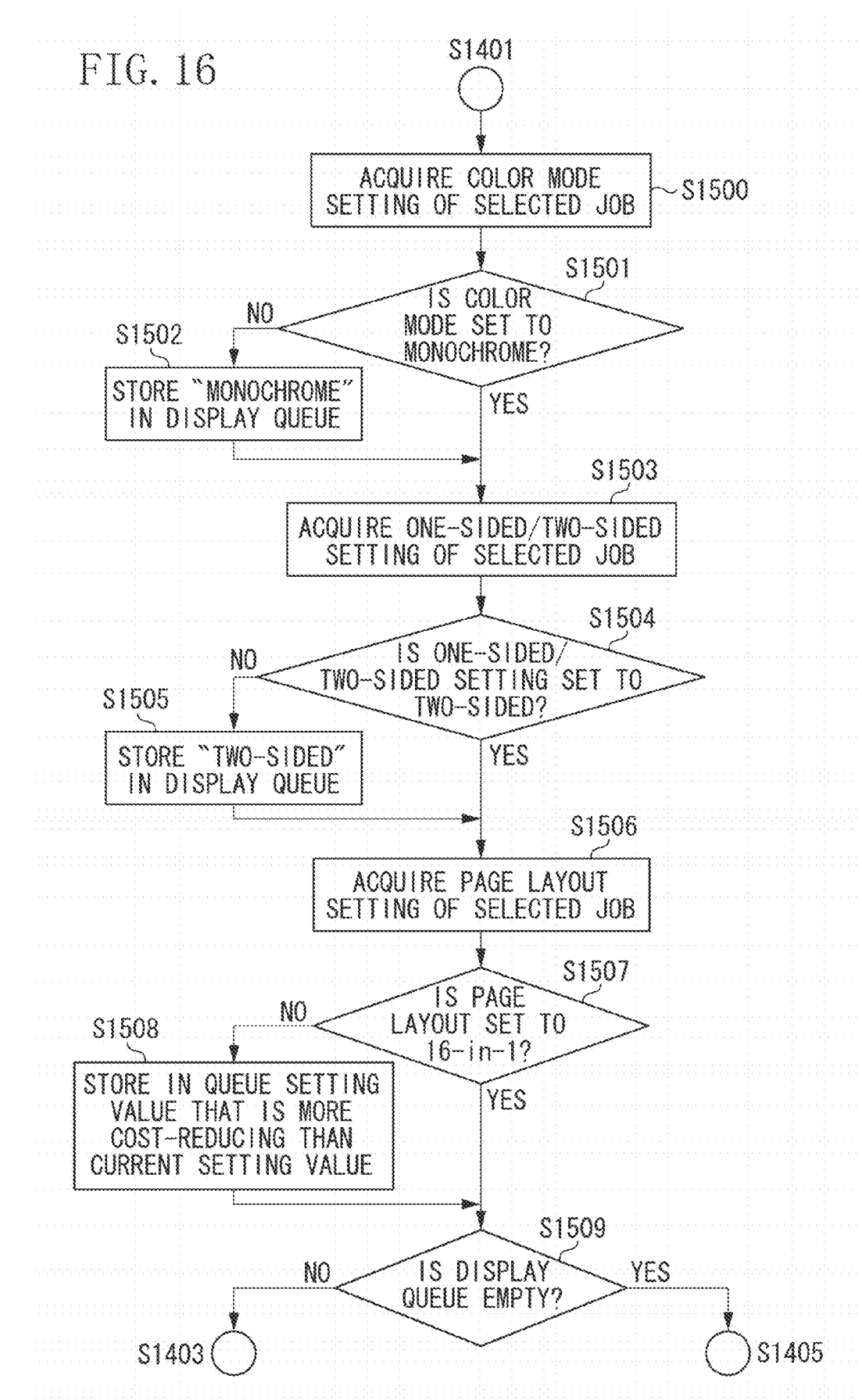
FIG. 16 is a detailed flow chart illustrating a cost-reducing setting determination process according to a first exemplary embodiment.

FIG. 16 is a flow chart illustrating details of the cost-reducing setting determination process (step S1402 in FIG. 15) according to the first exemplary embodiment. The control modules 502 and 503 are read from the auxiliary storage device 303 to the RAM 302 by the CPU 301 of the image forming apparatus 102 to execute the process illustrated in the flow chart. In the present exemplary embodiment, the print settings that are most print-cost-reducing are "two-sided" for the one-sided/two-sided setting 1104, "monochrome" for the color mode setting 1105, and "16 in 1" for the page layout setting 1106.

First, in step S1500, the job control unit 502 reads a selected print job stored in the reservation printing area 1201 and a value of the color mode setting 1105 of the print settings 1103 of the selected print job, and the processing proceeds to step S1501.

In step S1501, the cost-reducing setting determination unit 503 determines whether the color mode setting 1105 is "monochrome", which leads to print cost reduction.

If the cost-reducing setting determination unit 503 determines that the color mode setting 1105 is not "monochrome" (NO in step S1501), then in step S1502, the job control unit 502 stores the setting value "monochrome" in a display queue stored in the RAM 302. Then, the processing proceeds to step S1503.

On the other hand, if the cost-reducing setting determination unit 503 determines that the color mode setting 1105 is "monochrome" (YES in step S1501), the processing directly proceeds to step S1503.

In steps S1503 to S1505, the similar processes are performed with respect to the one-sided/two-sided setting 1104. In step S1503, the job control unit 502 reads a value of the one-sided/two-sided setting 1104 of the print settings 1103 of the selected print job, and the processing proceeds to step S1504.

In step S1504, the cost-reducing setting determination unit 503 determines whether the one-sided/two-sided setting 1104 is "two-sided", which leads to print cost reduction.

If the cost-reducing setting determination unit 503 determines that the one-sided/two-sided setting 1104 is not "two-sided" (NO in step S1504), then in step S1505, the job control unit 502 stores the setting value "two-sided", which leads to lower print cost than the current one-sided/two-sided setting value, in the display queue stored in the RAM 302. Then, the processing proceeds to step S1506.

On the other hand, if the cost-reducing setting determination unit 503 determines that the one-sided/two-sided setting 1104 is "two-sided" (YES in step S1504), the processing directly proceeds to step S1506.

In steps S1506 to S1508, the similar processes are performed with respect to the page layout setting 1106. In step S1506, the job control unit 502 reads a value of the page layout setting 1106 of the print settings 1103 of the selected print job, and the processing proceeds to step S1507.

In step S1507, the cost-reducing setting determination unit 503 determines whether the page layout setting 1106 is "16 in 1", which leads to print cost reduction.

If the cost-reducing setting determination unit 503 determines that the page layout setting 1106 is not "16 in 1" (NO in step S1507), then in step S1508, the job control unit 502 stores a setting value that is more cost-reducing than the current page layout setting value in the display queue held in the RAM 302. For example, if the value of the current page layout setting 1106 of the selected print job is "2 in 1", "4 in 1" is stored in the display queue. Then, the processing proceeds to step S1509.

On the other hand, if the cost-reducing setting determination unit 503 determines that the page layout setting 1106 is "16 in 1" (YES in step S1507), the processing directly proceeds to step S1509.

In step S1509, the job control unit 502 determines whether the display queue is empty.

If the job control unit 502 determines that the display queue is empty (YES in step S1509), the job control unit 502 determines that all of the settings are ecological print-cost-reducing print settings, and the processing proceeds to step S1405 in FIG. 15.

On the other hand, if the job control unit 502 determines that the display queue is not empty (NO in step S1509), the job control unit 502 determines that at least one of the settings is not an ecological print-cost-reducing print setting, and the processing proceeds to step S1403 in FIG. 15. In step S1403 in FIG. 15, the job control unit 502 creates an ecological setting button(s) for reducing the print cost based on the item(s) in the display queue and displays the created ecological setting button(s) on the image display device 304.

The above-described process provides an ecological setting button(s) for reducing the print cost with respect to the print settings 1103 of a print job to enable easy application of print-cost-reducing print settings.

In the above-described first exemplary embodiment, the configuration is described in which when one print job is selected, print settings that can lead to reduction in print cost of the selected print job are determined, and a print setting button(s) for applying the cost-reducing setting(s) is displayed.

In a second exemplary embodiment, a configuration will be described in which when a plurality of print jobs are simultaneously selected, print settings that can lead to reduction in print cost of all of the selected print jobs are determined, and a print setting button(s) for applying the cost-reducing setting(s) is displayed.

Figure 17:
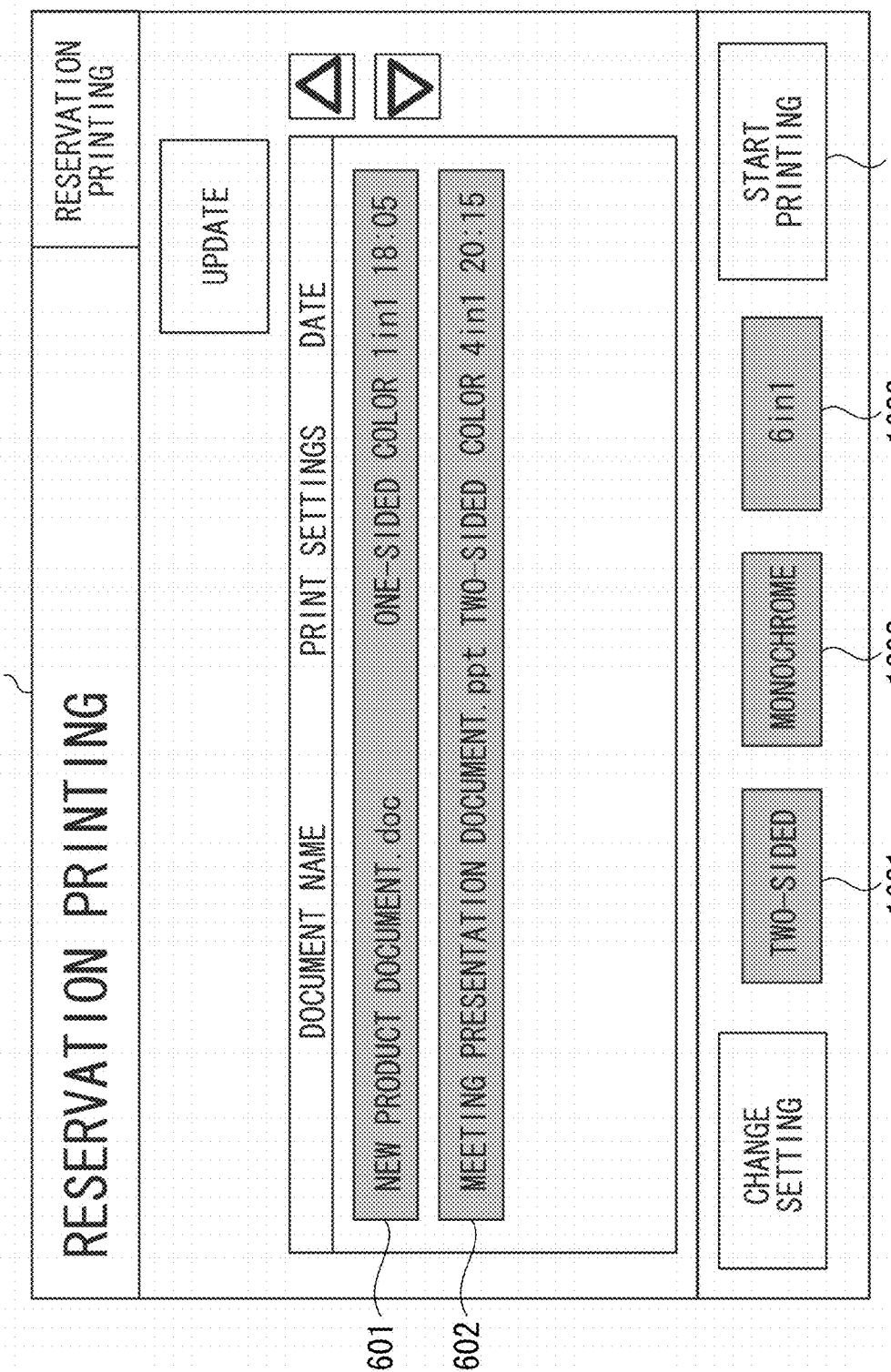
FIG. 17 illustrates an example of a print instruction screen in a case where a plurality of print jobs are simultaneously selected.

FIG. 17 illustrates an example of a print instruction screen in a case where the reserved print jobs 601 and 602 are simultaneously selected. The print instruction screen is displayed on the image forming apparatus 102 by the job control unit 502.

When the print jobs 601 and 602 are simultaneously selected, the job control unit 502 refers to the print settings 1103 of the print jobs 601 and 602 that are stored in the reservation printing area 1201 of the auxiliary storage device 303. Then, according to a determination by the cost-reducing setting determination unit 503, the job control unit 502 creates ecological setting buttons 1601, 1602, and 1603 for reducing the print cost of both of the selected print jobs 601 and 602, and displays the created ecological setting buttons 1601, 1602, and 1603 on the image display device 304.

The ecological setting button 1601 is a button for changing the one-sided/two-sided setting 1104 of all of the selected print settings to "two-sided". The ecological setting button 1602 is a button for changing the color mode setting 1105 of all of the selected print settings to "monochrome". The ecological setting button 1603 is a button for changing the page layout setting 1106 of all of the selected print settings to "6 in 1". In this way, according to the present exemplary embodiment, when a plurality of print jobs are simultaneously selected, the print settings of the selected plurality of print jobs are compared to determine a lowest-print-cost print setting, and a print setting that is more print-cost-reducing than the determined print setting is dynamically determined and provided as an ecological setting button.

When the user presses the ecological setting buttons 1601 and 1602, the print settings corresponding to the ecological setting buttons 1601 and 1602 are applied to the print jobs 601 and 602. More specifically, the job control unit 502 changes the corresponding setting values 1104 and 1105 of the print settings 1103 of the print jobs 601 and 602 that are stored in the RAM 302 to "two-sided" and "monochrome", and displays the print instruction screen 600 again based on the changed print settings. As a result, the print instruction screen 600 is changed to the display state as illustrated in FIG. 18.

Figure 18:
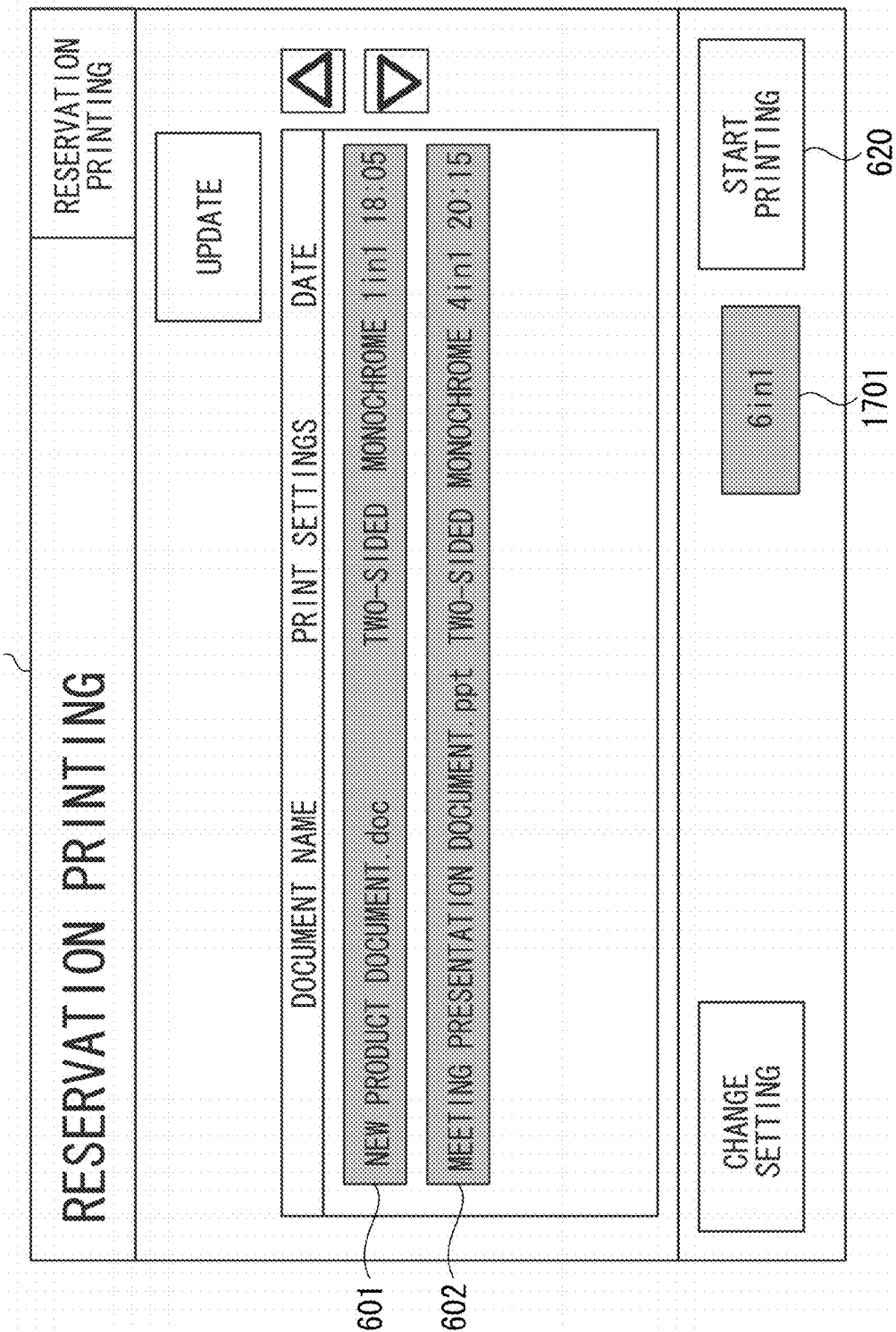
FIG. 18 illustrates an example of a print instruction screen displayed after print settings of a plurality of print jobs are changed.

FIG. 18 illustrates an example of a print instruction screen in a case where the reserved print jobs 601 and 602 are selected, and the ecological setting buttons 1601 and 1602 are pressed to change the print settings. The print instruction screen is displayed on the image forming apparatus 102 by the job control unit 502.

The job control unit 502 repeats the foregoing processes with respect to the print job 602 and creates an ecological setting button 1701 for changing the setting to "6 in 1", which leads to further print cost reduction.

The details of the determination process to be performed by the cost-reducing setting determination unit 503 according to the second exemplary embodiment will be described below with reference to FIG. 19.

Figure 19:
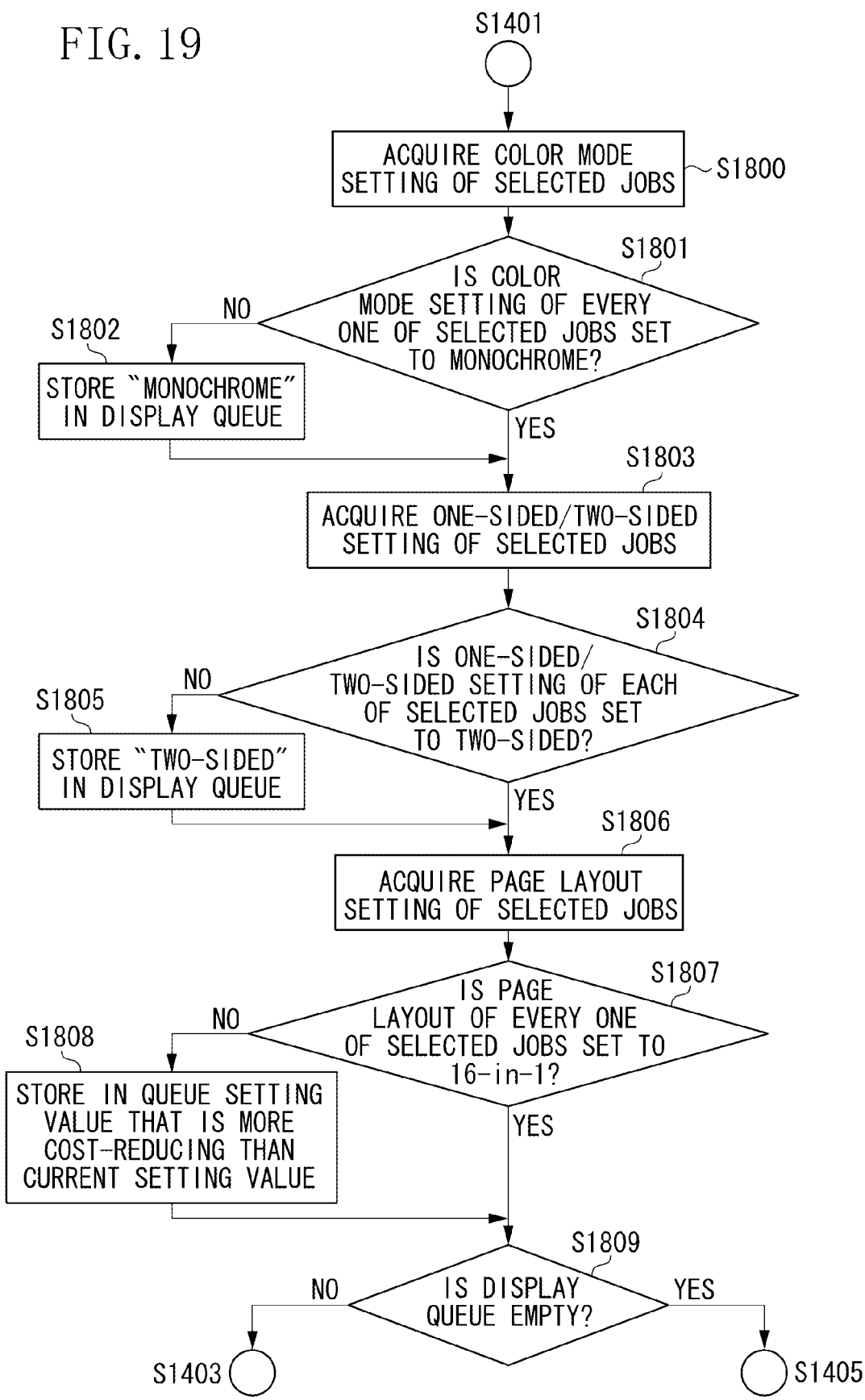
FIG. 19 is a detailed flow chart illustrating a cost-reducing setting determination process according to a second exemplary embodiment.

FIG. 19 is a flow chart illustrating an example of details of the cost-reducing setting determination process (step S1402 in FIG. 15) according to the second exemplary embodiment. The control modules 502 and 503 are read from the auxiliary storage device 303 to the RAM 302 by the CPU 301 of the image forming apparatus 102 to execute the process illustrated in the flow chart.

First, in step S1800, the job control unit 502 reads a value of the color mode setting 1105 of the print settings 1103 of the selected print jobs, and the processing proceeds to step S1801.

In step S1801, the cost-reducing setting determination unit 503 determines whether the color mode setting 1105 of each of the selected print jobs is "monochrome".

If the cost-reducing setting determination unit 503 determines that the color mode setting 1105 of any of the selected print jobs is not "monochrome" (NO in step S1801), then in step S1802, the job control unit 502 stores the setting value "monochrome" in the display queue held in the RAM 302. Then, the processing proceeds to step S1803.

On the other hand, if the cost-reducing setting determination unit 503 determines that the color mode setting 1105 of each of the selected print jobs is "monochrome" (YES in step S1801), the processing proceeds to step S1803.

In steps S1803 to S1805, the similar processes are performed with respect to the one-sided/two-sided setting 1104. In step S1803, the job control unit 502 reads a value of the one-sided/two-sided setting 1104 of the print settings 1103 of each of the selected print jobs, and the processing proceeds to step S1804. In step S1804, the cost-reducing setting determination unit 503 determines whether the one-sided/two-sided setting 1104 of each of the selected print jobs is "two-sided".

If the cost-reducing setting determination unit 503 determines that the one-sided/two-sided setting 1104 of any of the selected print jobs is not "two-sided" (NO in step S1804), then in step S1805, the job control unit 502 stores the setting value "two-sided", which is more print-cost-reducing than the current one-sided/two-sided setting value, in the display queue held in the RAM 302. Then, the processing proceeds to step S1806.

On the other hand, if the cost-reducing setting determination unit 503 determines that the one-sided/two-sided setting 1104 of each of the selected print jobs is "two-sided" (YES in step S1804), the processing proceeds to step S1806.

In steps S1806 to S1808, the similar processes are performed with respect to the page layout setting 1106. In step S1806, the job control unit 502 reads a value of the page layout setting 1106 of the print setting 1103 of each of the selected print jobs, and the processing proceeds to step S1807.

In step S1807, the cost-reducing setting determination unit 503 determines whether the print setting 1103 of each of the selected print jobs is "16 in 1".

If the cost-reducing setting determination unit 503 determines that the page layout setting 1106 of any of the selected print jobs is not "16 in 1" (NO in step S1807), then in step S1808, the job control unit 502 stores a setting value that is more print-cost-reducing than the current page layout setting value in the display queue held in the RAM 302. For example, a setting value that is more print-cost-reducing than the page layout setting value that is most print-cost-reducing among those of the selected print jobs is stored in the display queue. More specifically, in a case where the values of the page layout settings 1106 of the selected print jobs A and B are "2 in 1" and "4 in 1", respectively, "6 in 1" is stored in the display queue. Then, the processing proceeds to step S1809.

On the other hand, if the cost-reducing setting determination unit 503 determines that the page layout setting 1106 of each of the selected print jobs is "16 in 1" (YES in step S1807), the processing proceeds to step S1809.

In step S1809, the job control unit 502 determines whether the display queue is empty.

If the job control unit 502 determines that the display queue is empty (YES in step S1809), the job control unit 502 determines that all of the print settings of the selected print jobs are ecological print-cost-reducing print settings, and the processing proceeds to step S1405 in FIG. 15.

On the other hand, if the job control unit 502 determines that the display queue is not empty (NO in step S1809), the job control unit 502 determines that at least one of the settings of the selected print jobs is not an ecological print-cost-reducing print setting, and the processing proceeds to step S1403 in FIG. 15. In step S1403 in FIG. 15, the job control unit 502 creates a setting button(s) for reducing the print cost based on the item(s) in the display queue and displays the created ecological setting button(s) on the image display device 304.

As described above, according to the second exemplary embodiment, a print setting button for print cost reduction can be provided with respect to the print settings 1103 of all of the selected print jobs, and the print-cost-reducing print settings can be applied collectively with ease to a plurality of print jobs.

In the second exemplary embodiment, the configuration is described in which when a plurality of print jobs are simultaneously selected, an ecological setting button(s) corresponding to a print setting(s) that leads to reduction in print cost of all of the selected print jobs is presented. Alternatively, when a plurality of print jobs are simultaneously selected, a print setting that can reduce the print cost of at least one of the selected print jobs without increasing the print cost of any one of the selected print jobs may be determined, and a print setting button for applying the cost-reducing setting may be displayed.

According to the above-described exemplary embodiments, it is determined whether there is a print-cost-reducing print setting among the set print settings of a selected print job, and if there is a print-cost-reducing print setting, the print setting is displayed as an ecological setting button (button for prompting the user to change the print settings). With this configuration, according to exemplary embodiments, an ecological setting button can be dynamically displayed according to a selected print job. Thus, a print-cost-reducing setting can be provided dynamically with respect to a print job setting, and the print-cost reducing setting can be applied with ease while the process can be performed using an arbitrary setting.

It is apparent that configurations and contents of various types of data described above are not limited to those described above, and may vary according to the intended use or purpose of use.

While various exemplary embodiments have been described above, these exemplary embodiments can be implemented in the form of, for example, a system, an apparatus, a method, a program, a storage medium, etc. The exemplary embodiments can be applicable to a system including a plurality of devices or an apparatus including a single device.

Further, combinations of the exemplary embodiments described above are also applicable.

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-127852, filed Jun. 23, 2014, which is hereby incorporated by reference herein in its entirety.

What is claimed is:

1. An image forming apparatus comprising:
   a storage which is capable of storing a print job which is associated with a print setting;
   a display which is capable of displaying a list of print jobs stored in the storage; and
   a controller which selects a print job from the list of print jobs in a job selection screen displayed on the display, based on a user's instruction, the job selection screen including an object placement area in addition to a list placement area, the list of print jobs being placed in the list placement area, a selection object for changing the print setting of the selected print job being placed in the object placement area,
   wherein the object placement area and the list placement area are displayed on the same screen, and appropriate setting change(s) dependent on the selected print job are placed in the object placement area,
   in a case where the print setting associated with the selected print job indicates color printing, the controller places at least a selection object for setting a print color to be monochrome in the object placement area, in response to selection of the print job, and
   in a case where the print setting associated with the selected print job indicates monochrome printing, the controller does not place a selection object pertaining to print color setting in the object placement area, in response to selection of the print job.

2. The image forming apparatus according to claim 1, wherein the print job is a print job input from an information processing apparatus via a network or a print job input from a reader of the image forming apparatus.

3. The image forming apparatus according to claim 1, wherein
   a selection object for starting to print the selected print job is placed on the job selection screen.

4. The image forming apparatus according to claim 1, wherein
   a setting change object for displaying a setting change screen is placed on the job selection screen, and
   the setting change screen makes it possible to select either monochrome printing or color printing irrespective of the setting associated with the selected print job.

5. The image forming apparatus according to claim 1, wherein
   the display functions as a touch panel.

6. The image forming apparatus according to claim 1, wherein
   no selection object for changing the print setting is placed on the job selection screen in a state in which no print data is selected.

7. A method for controlling an image forming apparatus including a storage, the method comprising:
   storing, in the storage, a print job which is associated with a print setting;
   displaying, on a display, a list of print jobs stored in the storage; and
   selecting a print job from the list of print jobs in a job selection screen displayed on the display, based on a user's instruction, the job selection screen including an object placement area in addition to a list placement area, the list of print jobs being placed in the list placement area, a selection object for changing the print setting of the selected print job being placed in the object placement area,
   wherein the object placement area and the list placement area are displayed on the same screen, and appropriate setting change(s) dependent on the selected print job are placed in the object placement area, in a case where the print setting associated with the selected print job indicates color printing, at least a selection object for setting a print color to be monochrome is placed in the object placement area, in response to selection of the print job, and in a case where the print setting associated with the selected print job indicates monochrome printing, a selection object pertaining to print color setting is not placed in the object placement area, in response to selection of the print job.

8. A non-transitory computer-readable storage medium storing computer executable instructions for causing an image forming apparatus including a storage to execute a method, the method comprising:

storing, in the storage, a print job which is associated with a print setting;

displaying, on a display, a list of print jobs stored in the storage; and selecting a print job from the list of print jobs in a job selection screen displayed on the display, based on a user's instruction, the job selection screen including an object placement area in addition to a list placement area, the list of print jobs being placed in the list placement area, a selection object for changing the print setting of the selected print job being placed in the object placement area, wherein the object placement area and the list placement area are displayed on the same screen, and appropriate setting change(s) dependent on the selected print job are placed in the object placement area, in a case where the print setting associated with the selected print job indicates color printing, at least a selection object for setting a print color to be monochrome is placed in the object placement area, in response to selection of the print job, and in a case where the print setting associated with the selected print job indicates monochrome printing, a selection object pertaining to print color setting is not placed in the object placement area, in response to selection of the print job.

9. An image forming apparatus comprising:

a storage which is capable of storing a print job which is associated with a print setting;

a display which is capable of displaying a list of print jobs stored in the storage; and a controller which selects a print job from the list of print jobs in a job selection screen displayed on the display, based on a user's instruction, the job selection screen including an object placement area in addition to a list placement area, the list of print jobs being placed in the list placement area, a selection object for changing the print setting of the selected print job being placed in the object placement area, wherein the object placement area and the list placement area are displayed on the same screen, and appropriate setting change(s) dependent on the selected print job are placed in the object placement area, in a case where the print setting associated with the selected print job indicates one-sided printing, the controller places at least a selection object for setting a print surface to be two sides in the object placement area, in response to selection of the print job, and in a case where the print setting associated with the selected print job indicates two-sided printing, the controller does not place at least a selection object pertaining to print surface setting in the object placement area, in response to selection of the print job.

10. The image forming apparatus according to claim 9, wherein a selection object for starting to print the selected print job is placed on the job selection screen.

11. The image forming apparatus according to claim 9, wherein a setting change object for displaying a setting change screen is placed on the job selection screen, and the setting change screen makes it possible to select either one-sided setting or two-sided setting irrespective of the setting associated with the selected print job.

12. The image forming apparatus according to claim 9, wherein the display functions as a touch panel.

13. The image forming apparatus according to claim 9, wherein no selection object for changing the print setting is placed on the job selection screen in a state in which no print data is selected.

14. An image forming apparatus comprising:

a storage which is capable of storing a print job which is associated with a print setting;

a display which is capable of displaying a list of print jobs stored in the storage; and a controller which selects a print job from the list of print jobs in a job selection screen displayed on the display, based on a user's instruction, the job selection screen including an object placement area in addition to a list placement area, the list of print jobs being placed in the list placement area, a selection object for changing the print setting of the selected print job being placed in the object placement area, wherein the object placement area and the list placement area are displayed on the same screen, and appropriate setting change(s) dependent on the selected print job are placed in the object placement area, in a case where the print setting associated with the selected print job indicates 1-in-1 printing, the controller places at least a selection object for setting a page layout to be 2-in-1 in the object placement area, in response to selection of the print job, and in a case where the print setting associated with the selected print job indicates 2-in-1 printing, the controller places at least a selection object for setting a page layout to be 4-in-1 in the object placement area, in response to selection of the print job.

15. The image forming apparatus according to claim 14, wherein the controller controls the display to display a setting screen in which 4-in-1 printing can be specified, in response to specifying of the 2-in-1 printing via the setting screen in which 2-in-1 printing can be specified.

16. The image forming apparatus according to claim 14, wherein a selection object for starting to print the selected print job is placed on the job selection screen.

17. The image forming apparatus according to claim 14, wherein a setting change object for displaying a setting change screen is placed on the job selection screen, and the setting change screen makes it possible to select one from among a plurality of N-in-1 settings including 1-in-1 and 2-in-1 irrespective of the setting associated with the selected print job.

18. The image forming apparatus according to claim 14, wherein the display functions as a touch panel.

19. The image forming apparatus according to claim 14, wherein no selection object for changing the print setting is placed on the job selection screen in a state in which no print data is selected.

20. A method for controlling an image forming apparatus including a storage, the method comprising:

storing, in the storage, a print job which is associated with a print setting;

displaying, on a display, a list of print jobs stored in the storage; and selecting a print job from the list of print jobs in a job selection screen displayed on the display, based on a user's instruction, the job selection screen including an object placement area in addition to a list placement area, the list of print jobs being placed in the list placement area, a selection object for changing the print setting of the selected print job being placed in the object placement area, wherein the object placement area and the list placement area are displayed on the same screen, and appropriate setting change(s) dependent on the selected print job are placed in the object placement area, in a case where the print setting associated with the selected print job indicates one-sided printing, at least a selection object for setting a page layout to be 2-in-1 is placed in the object placement area, in response to selection of the print job, and in a case where the print setting associated with the selected print job indicates two-sided printing, at least a selection object for setting a page layout to be 4-in-1 is placed in the object placement area, in response to selection of the print job.

21. A method for controlling an image forming apparatus including a storage, the method comprising:

storing, in the storage, a print job which is associated with a print setting;

displaying, on a display, a list of print jobs stored in the storage; and selecting a print job from the list of print jobs in a job selection screen displayed on the display, based on a user's instruction, the job selection screen including an object placement area in addition to a list placement area, the list of print jobs being placed in the list placement area, a selection object for changing the print setting of the selected print job being placed in the object placement area, wherein the object placement area and the list placement area are displayed on the same screen, and appropriate setting change(s) dependent on the selected print job are placed in the object placement area, in a case where the print setting associated with the selected print job indicates 1-in-1 printing, at least a selection object for setting a page layout to be 2-in-1 is placed in the object placement area, in response to selection of the print job, and in a case where the print setting associated with the selected print job indicates 2-in-1 printing, at least a selection object for setting a page layout to be 4-in-1 is placed in the object placement area, in response to selection of the print job.

\* \* \* \* \*